Jan. 21, 1941.                B. DICK                 2,229,057
FLUID PRESSURE APPARATUS
Filed Aug. 25, 1939
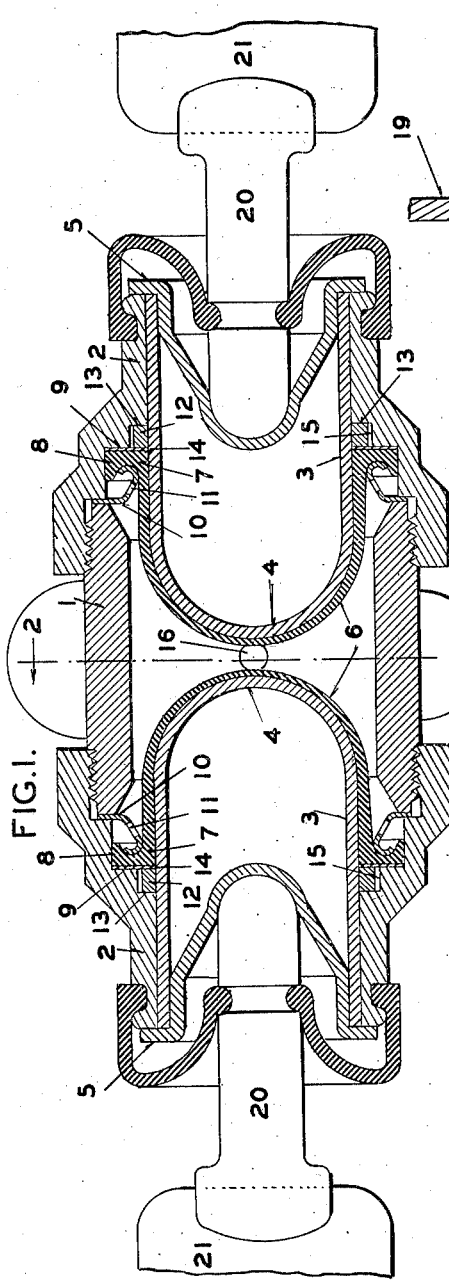
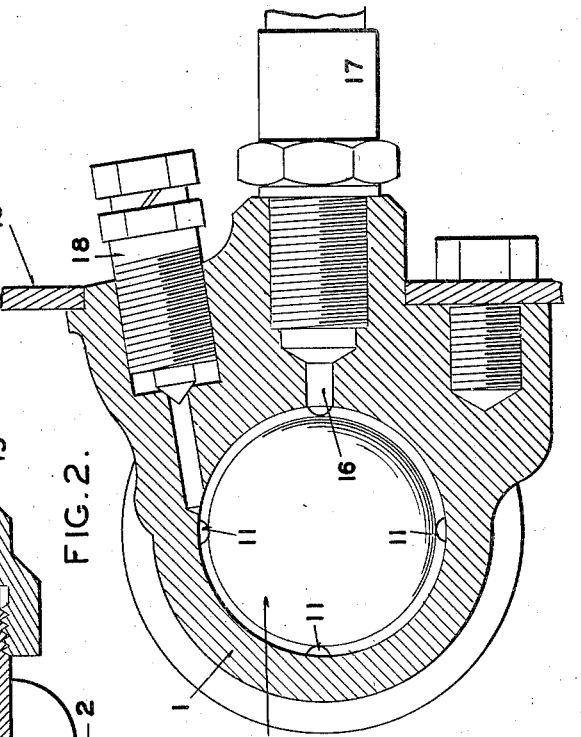
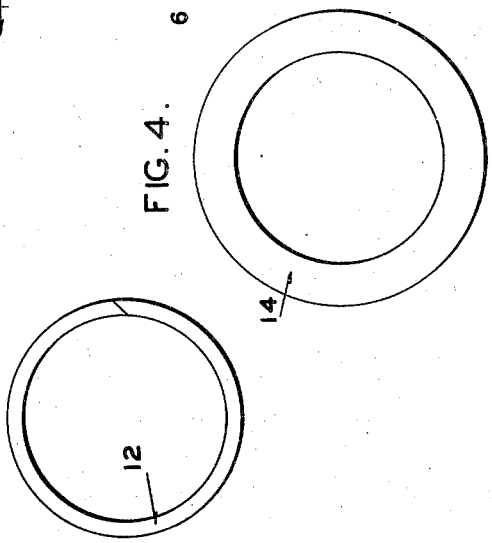
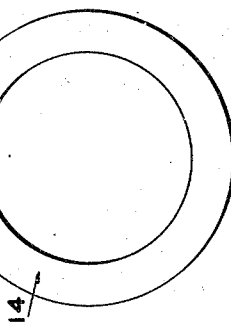
INVENTOR
BURNS DICK
BY
ATTORNEY Patented Jan. 21, 1941

2,229,057

UNITED STATES PATENT OFFICE 2,229,057

FLUID PRESSURE APPARATUS

Burns Dick, Ferguson, Mo., assignor to Wagner Electric Corporation, St. Louis, Mo., a corporation of Delaware Application August 25, 1939, Serial No. 291,853

7 Claims. (Cl. 60—54.6)

My invention relates to fluid pressure apparatus and more particularly to sealing means for preventing fluid under pressure from passing between a cylinder wall and a piston reciprocable therein.

One of the objects of my invention is to provide a sealing means for a piston and cylinder which will efficiently prevent leakage of fluid and also not be damaged during reciprocation of the piston.

A more specific object of my invention is to provide an improved sealing means for a reciprocable piston which is provided with a head portion that projects into an enlarged fluid containing chamber.

Other objects of my invention will become apparent from the following description taken in connection with the accompanying drawing in which Figure 1 is a cross-sectional view of a double piston fluid motor construction provided with sealing means embodying my invention; Figure 2 is a cross-sectional view taken on the line 2—2 of Figure 1; and Figures 3 and 4 are views of the ring and the annular plate employed to prevent damage to the rubber cup.

Referring to the drawing in detail, numeral 1 indicates a cylinder member which has secured to each of its ends by cooperating threads, a piston guide members 2. Within each guide member is a piston 3 having a semi-cylindrical head 4 projecting into the cylinder member 1 which is of larger diameter than the guide members. Each piston is formed with a shoulder 5 for engagement with the end of the guide member to limit the extent of inward movement of the piston. The head of each piston has associated therewith a flexible cup-shaped diaphragm 6 made of rubber or like material and snugly fitting said head and provided with a base 7 formed with an annular lip 8 positioned against an annular shoulder 9 on the piston guide portion. The base and the lip of each cup are held in position against the shoulder by an annular holding member 10 clamped between the cylinder and the piston guide member. Perforations 11 in the holding members permit fluid to contact the base and the lip 8 of each cup.

In order to prevent the inner corner of the base portion of the flexible cup from being forced into any clearance space between the wall of each piston and its piston guide portion, there is provided a split ring 12 which resiliently engages the wall of the piston and is positioned in a recess 13 in the piston guide portion. The width of the ring and the recess are such that the end surface of the ring will be flush with the shoulder 9. Interposed between the base of the cup and the split ring is a very thin annular metal plate 14 which has a slightly larger inner diameter than the outer diameter of the piston so as to be easily slipped thereover. The plate is of such radial width that it overlies the gap between the adjacent ends of the split ring and also any gap 15 between the outer surface of the ring and its recess 13.

The cylinder member 1 is provided with an inlet passage 16 which is connected by a conduit 17 with a suitable source of pressure, whereby the pistons can be moved apart when the fluid in the cylinder is placed under pressure. A bleeder outlet and screw 18 permits air to be bled from the cylinder. The particular double piston motor shown is especially adapted for the actuation of brake shoes, the cylinder being mounted upon a support 19 and the pistons having cooperating piston rods 20 engaging the ends of the brake shoes 21.

In operation when the fluid in cylinder 1 is placed under pressure, the pistons will be moved apart. The flexible cups will be forced by the fluid in tight engagement with the heads of their pistons. Also, fluid under pressure acts on the base 7 and lip 8 of each cup to maintain them in engagement with the surfaces they contact. Due to the piston ring and plate arrangement, there is no gap exposed into which any portion of the material of the base of the cup can be forced. Thus the cup is prevented from being cut or chewed when the piston is reciprocated by the fluid under pressure. If the ring and plate were not present, the clearance between the wall of the piston and the piston guide member would permit a portion of the material of the cup to be forced therein under high fluid pressures and this portion would easily be damaged or cut and the efficiency of the cup impaired. However, in the construction shown, this normal clearance is "blocked off" by the split ring 13 and no clearance is present because the resilient ring snugly engages the wall of the piston at all times. Also, with the thin plate 14 the gap between the ends of the spring and the gap 15 between the ring and recess will not be exposed to any portion of the base of the cup. Due to the thinness of plate 14, the edge thereof cannot cut the cup even if the material of the cup is forced into any slight clearance between its edge and the adjacent surface.

Although the particular sealing means for the piston is shown as being applied to a fluid motor, it can also be incorporated in a fluid pressure developing system wherein the piston is moved into the cylinder 1 to develop pressure instead of being moved by fluid pressure.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a fluid chamber, a piston guide member, a piston reciprocable in the guide member with its head exposed to the fluid in the chamber and having a clearance with said guide member, a flexible packing element carried by the guide member and surrounding and engaging the wall of the piston, and means comprising a member carried by the guide member against movement with the piston and associated with the packing element and resiliently engaging the wall of the piston at all times notwithstanding wear thereof for preventing fluid under pressure from forcing material of the packing element into said clearance space.

2. In apparatus of the class described, a fluid chamber, a piston guide member, a piston reciprocable in the guide member wtih its head exposed to the fluid in the chamber and having a clearance with the guide member, a flexible packing element carried by the guide member and surrounding and engaging the wall of the piston, and means comprising a split resilient ring capable of constantly engaging the piston wall surface notwithstanding wear thereof and interposed between the packing element and the guide member for preventing material of the packing element from being forced by fluid pressure into said clearance space.

3. In apparatus of the class described, a fluid chamber, a piston guide member, a piston reciprocable in the guide member with its head exposed to the fluid in the chamber and having a clearance with said guide member, a flexible packing element carried by the guide member and surrounding and engaging the wall of the piston, means carried by the guide member against movement with the piston and associated with the packing element and the wall of the piston for preventing fluid under pressure from forcing any material of the packing element into said clearance space, said means comprising a split resilient ring engaging the wall of the piston, and a thin annular plate interposed between the ring and the packing element and covering the gap between the ends of the ring.

4. In apparatus of the class described, a fluid chamber, a piston guide member, a piston reciprocable in the guide member and having its head projecting into the chamber, a flexible packing element surrounding the piston and positioned at the end of the guide member, a contractable split ring engaging the piston wall and received in a recess in the end of the guide member, and a thin annular plate interposed between the packing element and the ring and covering the gap between the ends of the ring.

5. In apparatus of the class described, a cylinder provided with a piston guide portion and an enlarged fluid receiving chamber, said cylinder having an annular shoulder and an annular recess at the end of the piston guide portion, a piston reciprocable in said guide portion and having its head extending into the chamber, a split ring in constant engagement with the outer wall surface of the piston and positioned in the recess to be flush with the surface of the shoulder, an annular thin plate positioned in engagement with the shoulder and ring and covering the gap between the ends of the ring and any opening between the ring and the wall of the recess, and a flexible packing element surrounding the piston and positioned in engagement with the plate.

6. In apparatus of the class described, a cylinder provided with a piston guide portion and an enlarged fluid receiving chamber, said cylinder having an annular shoulder at the juncture of the guide and chamber, a piston reciprocable in the guide portion and provided with a semi-cylindrical head projecting into the chamber, a semi-cylindrical flexible and extensible packing cup surrounding the head of the piston and having an annular flange at its base positioned adjacent the shoulder, means comprising an annular member carried by the guide portion and associated with the flange of the packing element and resiliently engaging the wall of the piston at all times notwithstanding wear thereof for preventing fluid under pressure from forcing material of the packing element into the clearance space between the wall surface of the piston and the cooperating surface of the guide portion, and a separable annular holder secured to the cylinder and cooperating with the cup flange for maintaining the latter in engagement with the shoulder.

7. In apparatus of the class described, a cylinder provided with a piston guide portion and an enlarged fluid receiving chamber, said cylinder having an annular shoulder and an annular recess at the juncture of the guide and chamber, a piston reciprocable in the guide portion and provided with a semi-cylindrical head projecting into the chamber, the semi-cylindrical flexible and extensible packing cup surrounding the head of the piston and having an annular flange at its base positioned adjacent the shoulder, a split ring positioned in the recess and resiliently engaging the outer wall surface of the piston, an annular thin plate positioned between the flange of the cup and the shoulder and ring and covering the gap between the ends of the ring and any opening between the ring and the wall of the recess whereby said flange at the base of the cup is prevented from being forced into said gap and opening, and an annular holder secured to the cylinder and cooperating with the flange of the cup for maintaining the latter in engagement with the plate.

BURNS DICK.